Jan. 10, 1956 J. W. ANDERSON 2,730,580

ADVANCING PAPERWEIGHT LIFTER

Filed July 3, 1951

INVENTOR.
JOHN W. ANDERSON
BY
Charles S. Penfold
ATTORNEY 2,730,580

ADVANCING PAPERWEIGHT LIFTER

John W. Anderson, Gary, Ind.

Application July 3, 1951, Serial No. 235,056

12 Claims. (Cl. 179—178)

This invention relates generally to paperweights and more particularly is directed to a device carried by the base of a conventional cradle telephone in a manner whereby the base may be utilized to hold one or more sheets of paper or other material in place on a support such as a table or desk.

Almost everyone while carrying on a conversation over a telephone has experienced some difficulty in trying to master the art of simultaneously writing on and holding a piece of note paper or pad in place with one hand while using the other hand to support the receiver.

Nearly all telephone users have, repeatedly, the experience of meeting, in the course of a telephone conversation, the need for making notes on paper for future reference. The common experience, with the receiver in one hand, is to reach for a pencil and a piece of paper with the other and then endeavor to hold the piece of paper in place with one elbow while administering the notes with the other hand.

Such awkward procedure delays the conclusion of telephone conversations and at times results in illegible or inadequate notes. When the telephone conversation is by long distance, there is a substantial addition to the charge for the call, due to any considerable delay in finding and applying the pencil.

With this in mind one of the principal objects of the invention is to provide a novel device which can be conveniently manipulated with one hand or one finger to cause the telephone to engage and hold firmly in place a sheet of paper, after which one hand can be used to support the receiver and the other is free for writing on the firmly held paper.

The device may be designed and constructed so as to constitute an original or integral part of a telephone base structure but, as herein illustrated and described, it is preferably made in the form of an accessory that can be readily connected detachably to such a base or other weight.

One important object of the invention is to provide an accessory device comprising a support provided with flexible means for connecting or clamping the support to a telephone base or other weighted object and a lever pivotally connected to the support for raising and lowering the one end of the object, to permit it to engage a paper to be held in place for receiving writing.

A particular object of the invention is to provide a device of the character just referred to in which the lever is so designed and constructed that when manually depressed in one direction, the telephone base will be raised and advanced a sufficient distance toward the operator to overhang one or more sheets of paper arranged on a support in a predetermined position in front of the base and when released the legs or pads on the front end of the base will be caused to rest or bear upon such paper to hold or anchor the same firmly in position for written notations.

A significant object of the invention is to provide a device in which the lever thereof is normally held in a predetermined position at the front of the telephone base for convenient manipulation without in any way interfering with the use or operation of the telephone or without interfering with the use of paper held by the base.

Another object of the invention is to provide a device which may be adjusted so that it may be readily connected detachably to telephone bases of different widths or sizes without modifying or altering in any way the original structure or character of such bases, and without marring or defacing any part of the telephone.

A further object of the invention is to provide a device in which the support thereof includes a portion which bridges or extends transversely underneath the base of a conventional cradle phone in an out-of-the-way position, preferably directly back of the two front legs or pads on the base.

Another object of the invention is to provide a convenient retainer for a pencil to be held where it will be most readily accessible in the process of engaging and manipulating the invention for any of the purposes above described.

A still further object of the invention is to provide for the purposes stated a device comprised of a minimum number of parts or components which can be economically manufactured and assembled.

Other objects and advantages of the invention will become apparent after the description hereinafter set forth is considered in conjunction with the drawings annexed hereto.

Figures 1 through 7 exemplify one embodiment of the invention and Figure 8 a second embodiment of the invention.

Figures 1, 2:
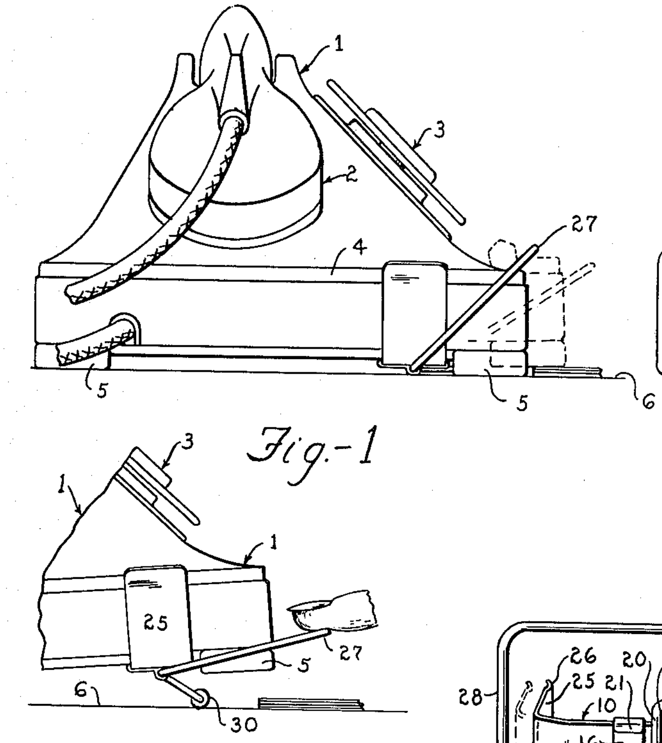
Figure 1 is a side view in elevation of a conventional cradle telephone showing the device applied to the base thereof.
Figure 2 is another side view of the telephone showing that the device has been operated to locate the front end of the base in an overhanging position with respect to a pad of paper.
Figure 3:
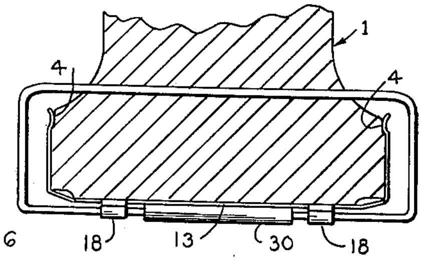
Figure 3 is a transverse section taken through an appropriate part of the telephone base depicting the manner of connecting the device to the base.

Referring first to the embodiment of the invention exemplified in Figures 1 through 7 of the drawing, numeral 1 represents the base of a conventional cradle telephone, 2 the receiver thereof, and 3 a dialing member. The base, among other things, includes a generally square or rectangular portion having sides provided with shoulders constituting abutments 4 which may extend the full length of the base. The base is provided at each of its corners with a leg or rest pad 5 so that the base proper is supported at a predetermined level with respect to a mounting 6 which may be a table or desk.

Figure 4:
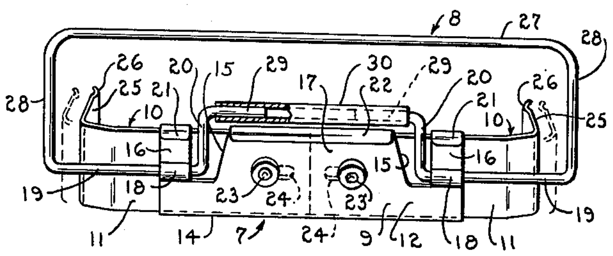
Figure 4 is a bottom plan view of the device showing a support for engaging a telephone base and a lever pivotally connected to the support for the purpose specified, including means whereby the support is made extensible so as to fit bases of various widths.

The accessory device, as shown in Figure 4, includes, among other things, a support generally designated 7 and a lever generally designated 8 which is pivotally connected to the support in any suitable manner.

The support 7 preferably comprises an elongated flat tubular supporting member 9 and a pair of corresponding generally L-shaped holders 10 having legs 11 which are slidably received in the ends of the supporting member. The support 7 and member 9, in effect, constitute a clamp.

The member 9 is constructed of a single piece of sheet metal and includes a bottom wall 12 and a top wall 13 joined together along one edge as indicated at 14. The longitudinal marginal edge of the bottom wall is provided with a notch 15 adjacent each of its ends to form a finger 16 and an intervening portion 17. Each of the fingers is preferably bent to form a bearing 18 generally U-shaped in cross-section, within which fulcrum portions 19 of the lever 8 are journalled. It will be noted that the fulcrum or journalled portions 19 of the lever are aligned and held in the bearings 18 by the legs 11 of the holders and that the notches 15 provide clearance so that portions 20 of the lever may bear against the legs 11 when the lever is in its normal inoperative position. The matter of clearance is a significant factor because of the limited space available between the underside of the telephone base and the upper surface of the mounting 6.

Figure 6:
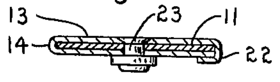
Figure 6 is a transverse section taken through an appropriate part of the structure in Figure 4 showing a detail of the extensible feature of the support.
Figure 7:
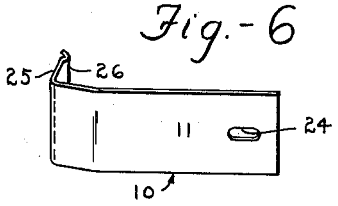
Figure 7 is a view of one of the component parts of the support above referred to; and, Figure 8 is a second embodiment of the invention exemplifying a device having a support which is not extensible.

The longitudinal marginal edge portion of the top wall 13 of the supporting member 9 is provided with a pair of lugs 21 and a flange 22 which are respectively folded over and against the pair of fingers 16 and the intervening portion 17 to lock the top and bottom walls of the member 9 in parallel relationship and at the same time afford a binding action against the legs 11 of the holders so that the holders will be automatically frictionally held in any position to which they may be individually adjusted. It is to be understood that various types of means may be employed to provide sufficient frictional resistance to prevent accidental displacement of the holders with respect to the supporting member. Also, any means suitable for the purpose may be utilized to limit the sliding movement of the holders with respect to the supporting member. As herein shown, movement of each holder is preferably limited by a rivet 23 which extends through holes in the walls 12 and 13 in the supporting member and through a slot 24 in the leg 11 of each holder. As illustrated in Figure 6, the upper head of each rivet is disposed substantially flush with the upper surface of the top wall 13 so that such wall will bear against the underside of the telephone base. In other words, it is more or less necessary to hold the overall thickness of the supporting member to a minimum due to the limited space available between the underside of the telephone base and the upper surface of the mounting 6.

Various means may be used to secure the device to a telephone base but as herein illustrated each of the holders is provided with an upstanding slightly inturned flexible leg 25 having a detent 26 across the free end thereof. The legs 25 are of a length somewhat less than the legs 11 but are of a sufficient height to more or less bear against the sides of the telephone base so that the detents 26 will cooperate with the abutments 4 provided on the base. When the device is being applied to the base, the detents in most instances will snap into engagement with the abutments. It will be noted that the holders yieldably embrace or clamp the telephone base and are preferably of a width to impart stability to the device so as to insure a good holding connection with the base and prevent displacement of the device when the lever 8 is manually actuated.

Figure 5:
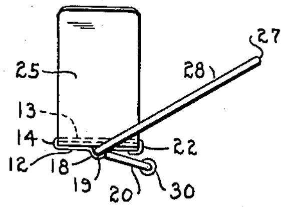
Figure 5 is a side view in elevation of the device illustrating details with respect to connecting the support and lever together.

The lever 8 constituting a component of the device may be designed and constructed as desired, but is preferably made from a single piece of round wire or rod stock and of a width considerably greater than its length. More particularly, it is preferably made in the form of a bail that includes a handle portion 27 and sides 28. The distance between the sides 28 is sufficient to straddle the base as shown in Figures 1 and 2. It will be noted that the handle portion 27 constituting one end of the lever, sides 28, and fulcrum portions 19 are arranged in a single plane and form a rectangle. The lever also includes a pair of aligned portions 29 which are offset from the portions 20. The portions 29 are preferably confined within an elongated cylindrical tubular roller bearing 30 as shown in Figure 4. The fulcrum portions 19, aligned portions 29 and the handle portion 27 of the lever are arranged in parallel relation and the portions 20 are arranged parallel to the sides 28 of the lever. Attention is directed to the fact that the portions 20, aligned portions 29 and tubular bearing 30 are arranged substantially in a single plane, which plane is disposed at an inclination or acute angle with respect to the plane formed by the rectangular part of the lever as shown in Figure 5. Otherwise expressed, the lever includes a large generally U-shaped portion and a small U-shaped portion which are joined together by the journalled or fulcrum portions 19. With this unique arrangement it will be manifest that the tubular bearing 30 and portions 29 constitute the other end of the lever, that the bearing is located substantially between the handle 27 and fulcrum portions 19, and that the distance between the handle and the fulcrum portions 19 is greater than the distance between the tubular bearing 30 and the fulcrum portions 19 so as to afford a good leverage action that requires but a small amount of manual pressure or force on the handle to raise the front end of the telephone base.

Attention is directed to the fact that the lever serves to retain a pencil on the telephone base for convenient accessibility as shown by the dotted lines in Figure 1.

It is important to note that the spacing between the pivotal fulcrum points of connection between the portions 19 and bearings 18 and the length of the tubular bearing 30 are sufficient to stabilize the movement of the lever with respect to its support and movement of the telephone with respect to the mounting on which it rests.

The procedure customarily followed in operating the device to hold a piece of paper in place is a simple matter. After the paper is placed in front of the telephone base, preferably against the front legs 5, it is merely necessary to press down on the handle 27 of the lever which will raise the forward end of the base and direct such end over the paper as shown in Figure 2. When the lever is released the base will fall onto the paper as shown by the dotted lines in Figure 1 to hold the paper with sufficient firmness to prevent accidental displacement thereof while making notes thereon.

Attention is directed to the fact that since the person using the telephone is generally seated in front of the telephone or a little to one side thereof, there is a tendency to exert a slight pull on the handle of the lever when it is depressed. This light pull is not ordinarily noticed by the person actuating the lever but it nevertheless still assists in directing the telephone over the paper. While the handle is being depressed, the roller bearing 30 moves downwardly and rearwardly with respect to the support 7 and causes the telephone to advance forwardly. The mounting 6 ordinarily limits the extent of the downward movement of the handle. When the handle is released, the weight of the telephone causes the lever to automatically return to substantially its normal inoperative position as shown by the full lines in Figure 1. Repeated usage, in which the pads under the two front corners of the telephone base have some appreciable impact, each time, against the mounting, which is usually a solid desk top, or glass desk cover, tends to hammer down and equalize the effective height of the pads with relation to the plane of the mounting, so that they soon engage their respective portions of the paper uniformly. For telephone bases that do not have individual pads at their corners suitable and readily attachable, pads for the two front corners, or for more corners, may be supplied with the device when offered for service. Only a short period of use is required to make any operator quite adept in applying the device for its purpose. The arrangement is preferably such that the weight of the telephone on the mounting 6 offers sufficient resistance to hold the telephone in the position to which it has been advanced while allowing the roller 30 to roll backward easily on the mounting. The factors of weight and frictional resistance serve to maintain the telephone in any position to which it may have been advanced while the lever returns to its normal inoperative position. More specifically the rear legs or pad 5 of the telephone base offer greater resistance to movement of the telephone than the resistance produced by the return movement of the roller bearing on the mounting 6.

Figure 8:
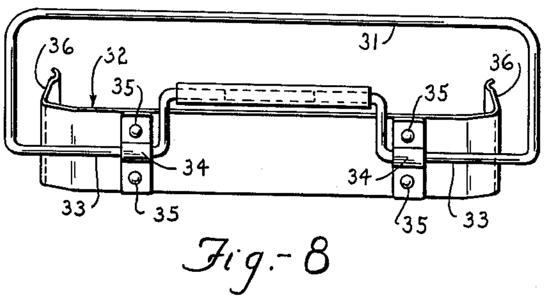

The second embodiment of the invention exemplified in Figure 8 of the drawing will now be described. As stated above, the support in this embodiment is not adjustable or extensible as in the first embodiment of the invention. More particularly the second embodiment comprises a lever 31 which is pivotally connected to a support 32. The lever substantially corresponds to the lever of the first embodiment of the invention and, among other things, includes a pair of fulcrum portions 33 which are journalled in a pair of bearings 34, the latter of which are preferably secured to the support by means of rivets 35. The support includes an elongated base portion which carries the bearings just referred to and integral flexible upturned portions 36 which are adapted to detachably connect the device to a telephone base in substantially the same manner as the device is held in the first embodiment of the invention.

While I have shown and described my invention in connection with a certain specified embodiment, it will, of course, be understood that I do not wish to be limited thereto, since it is apparent that modifications may be made in such embodiment and the materials thereof without departing from the spirit and scope of my invention as set forth in the appended claims.

I claim:

1. In combination: a mounting, a telephone base disposed on the mounting, a lever, and means pivotally connecting the lever to the underside of the base adjacent its forward end, said lever having a part engaging the mounting and also a handle for pivoting the lever to cause the said part to raise the forward end of the base.

2. In combination: a mounting, a telephone base having legs resting on the mounting for maintaining the base in spaced relation to the mounting, a lever, means arranged in the space and pivotally connecting the lever to the underside of the base adjacent its forward extremity, means holding the connecting means to the base, and said lever having a displaceable fulcrum and also a handle which when manipulated in a predetermined direction will cause the fulcrum to move on the mounting and raise the forward extremity of the base.

3. In combination: a mounting, a telephone base having legs resting on the mounting for maintaining the base in spaced relation to the mounting, a lever, means arranged in the space and pivotally connecting the lever to the underside of the base adjacent its forward extremity, means holding the connecting means to the base, and said lever having a displaceable fulcrum and also a handle which when manipulated in a predetermined direction will cause the fulcrum to simultaneously raise and advance the base along the mounting.

4. A telephone base, a lever, and means pivotally connecting the lever to the forward end of the base, said lever having a part disposed under the base and also having a handle for actuating the lever to cause the part to raise the forward end of the base above a mounting upon which the base may be placed.

5. An accessory device for lifting a paperweight with respect to a mounting, said device comprising an elongated support and a lever, means for detachably connecting the support to a weight, and means connecting the lever to the support for movement about the longitudinal axis of the support, said lever having a part adapted for disposition below the weight and also having a handle for manipulating the lever to cause the part when so disposed to engage a mounting to raise the weight from the mounting.

6. An accessory for lifting a telephone base comprising an elongated support, means for attaching the support to a base, a lever having a handle constituting one end of the lever, said lever being formed to provide a pair of aligned portions journalled at longitudinally spaced locations on the support and arranged in spaced parallel relation to the handle, said lever also being formed to provide parallel sides and offset portions arranged parallel to the sides, said offset portions being provided with bearing portions arranged parallel to the handle and journalled portions and constituting the other end of the lever, said handle, journalled portions and sides of the lever forming a plane and the offset portions and bearing portions forming another plane arranged at an acute angle with respect to the first mentioned plane to locate the bearing portions in a position between the handle and journalled portions.

7. An accessory for lifting the forward end of a telephone base comprising a support having means for attaching it to a base, a lever having a fulcrum pivotally connected to the support, said lever including a long part and a short part extending from the fulcrum and forming an acute angle, a handle provided on the free end of the long part and the free end of the short part providing a bearing for engaging a mounting for a telephone base.

8. An accessory for raising a telephone base comprising an elongated supporting member, a pair of holders connected to the member for a longitudinal adjustment to facilitate attachment of the accessory to a telephone base, a lever pivotally connected to the supporting member and having a bearing part adapted for disposition under a base and another part having a handle adapted for disposition adjacent to the front of the base for manipulating the bearing part.

9. A telephone base of the cradle type, an elongated support disposed under the base, flexible means extending upwardly from the support for attaching the support to the base, a lever having aligned portions journalled at longitudinal spaced points on the support, said lever having a first generally U-shaped part joined to the journalled portions for disposition under the base for raising the base, and said lever also having a second generally U-shaped portion joined to the journalled portions for straddling the base.

10. In combination: a mounting, a telephone base having legs resting on the mounting for maintaining the base in spaced relation to the mounting, a lever, means pivotally connecting the lever to the underside of the base adjacent its forward extremity, and said lever having a displaceable fulcrum and also a handle which when manipulated in a predetermined direction will cause the fulcrum to move on the mounting and raise the forward extremity of the base.

11. A weight for holding paper in place on a mounting, a lever and means pivotally connecting the lever to the forward portion of the weight, said lever having a part disposed below the weight and also having a handle for actuating the lever to cause the part to raise the forward portion of the weight above a mounting upon which the weight may be placed for releasing any paper disposed between the weight and a mounting.

12. An accessory device for manipulating a paperweight with respect to a mounting, said device comprising supporting means having a pair of longitudinally spaced bearings, means for detachably connecting the supporting means to a weight, means connecting the lever to the bearings for movement about the longitudinal axes of the bearings, said lever having a part adapted for disposition below the weight and also having a handle for manipulating the lever to cause the part when so disposed to engage a mounting to raise the weight from the mounting.

References Cited in the file of this patent

UNITED STATES PATENTS

| | | |
|---|---|---|
| 525,677 | Collins et al. | Sept. 4, 1894 |
| 1,303,305 | Haymond | May 13, 1919 |
| 2,529,657 | Kennedy | Nov. 14, 1950 |
| 2,585,664 | Le May et al. | Feb. 12, 1952 |